United States Patent
Rothman

(10) Patent No.: US 9,922,334 B1
(45) Date of Patent: Mar. 20, 2018

(54) PROVIDING AN ADVERTISEMENT BASED ON A MINIMUM NUMBER OF EXPOSURES

(75) Inventor: Aaron Nathaniel Rothman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 328 days.

(21) Appl. No.: 13/441,298

(22) Filed: Apr. 6, 2012

(51) Int. Cl.
   G06Q 30/00 (2012.01)
   G06Q 30/02 (2012.01)

(52) U.S. Cl.
   CPC ......... *G06Q 30/02* (2013.01); *G06Q 30/0275* (2013.01)

(58) Field of Classification Search
   USPC .......................................... 705/50–79, 14.71
   See application file for complete search history.

(56) References Cited

U.S. PATENT DOCUMENTS

| | | |
|---|---|---|
| 5,675,788 A | 10/1997 | Husick et al. |
| 5,724,521 A | 3/1998 | Dedrick |
| 5,740,549 A | 4/1998 | Reilly et al. |
| 5,848,397 A | 12/1998 | Marsh et al. |
| 5,850,433 A | 12/1998 | Rondeau |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,189,003 B1 | 2/2001 | Leal |
| 6,259,127 B1 | 7/2001 | Pan |
| 6,269,361 B1 | 7/2001 | Davis et al. |

(Continued)

FOREIGN PATENT DOCUMENTS

| | | |
|---|---|---|
| EP | 1 271 458 | 1/2003 |
| EP | 1 286 288 | 2/2003 |

(Continued)

OTHER PUBLICATIONS

Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en- us/dnmitta/html/bestpractaui.asp.

(Continued)

*Primary Examiner* — James A Reagan
(74) *Attorney, Agent, or Firm* — Foley & Lardner LLP

(57) ABSTRACT

Methods and systems for providing an advertisement based on a minimum number of exposures may include receiving selection criteria to specify a device identifier that meets the selection criteria, receiving a minimum number of exposures to the advertisement and an interval of time for the minimum number of exposures to occur, and a maximum aggregate bid value for each device identifier that is exposed to the advertisement for the minimum number of exposures, determining a probability that the device identifier reaches the number of exposures within the interval of time and within the maximum aggregate bid value, selecting a bid for each exposure for the device identifier based on the determined probability and the maximum aggregate bid value; and based on the selection of the bid, providing display data indicative of the advertisement.

20 Claims, 4 Drawing Sheets

(56) References Cited

U.S. PATENT DOCUMENTS

| | | |
|---|---|---|
| 6,275,806 B1 | 8/2001 | Pertrushin |
| 6,332,127 B1 | 12/2001 | Bandera et al. |
| 6,401,075 B1 | 6/2002 | Mason et al. |
| 6,600,930 B1 | 7/2003 | Sakurai et al. |
| 6,647,257 B2 | 11/2003 | Owensby |
| 6,665,293 B2 | 12/2003 | Thornton et al. |
| 6,677,894 B2 | 1/2004 | Sheynblat et al. |
| 6,684,249 B1 | 1/2004 | Frerichs et al. |
| 6,857,007 B1 | 2/2005 | Bloomfield |
| 6,956,816 B1 | 10/2005 | Alexander et al. |
| 6,983,331 B1 | 1/2006 | Mitchell et al. |
| 6,985,882 B1 | 1/2006 | Del Sesto |
| 7,016,343 B1 | 3/2006 | Mermel et al. |
| 7,039,599 B2 | 5/2006 | Merriman et al. |
| 7,120,235 B2 | 10/2006 | Altberg et al. |
| 7,136,875 B2 | 11/2006 | Anderson et al. |
| 7,376,640 B1 | 5/2008 | Anderson et al. |
| 7,406,434 B1 | 7/2008 | Chang et al. |
| 7,613,637 B2 | 11/2009 | Chan et al. |
| 7,668,950 B2 | 2/2010 | Horowitz et al. |
| 7,853,255 B2 | 12/2010 | Karaoguz et al. |
| 7,904,460 B2 | 3/2011 | Armour et al. |
| 8,195,133 B2 | 6/2012 | Ramer et al. |
| 8,204,881 B2 | 6/2012 | Holt et al. |
| 8,214,342 B2 | 7/2012 | Meiresonne |
| 8,234,275 B2 | 7/2012 | Grant et al. |
| 8,386,386 B1 | 2/2013 | Zhu |
| 8,453,058 B1 | 5/2013 | Coccaro et al. |
| 8,903,716 B2 | 12/2014 | Chen et al. |
| 2001/0020236 A1 | 9/2001 | Cannon |
| 2001/0025275 A1 | 9/2001 | Tanaka et al. |
| 2002/0029226 A1 | 3/2002 | Li et al. |
| 2002/0042829 A1 | 4/2002 | Mizuhara et al. |
| 2002/0077130 A1 | 6/2002 | Owensby |
| 2002/0082938 A1 | 6/2002 | Borger et al. |
| 2002/0091571 A1 | 7/2002 | Thomas et al. |
| 2002/0128908 A1 | 9/2002 | Levin et al. |
| 2002/0161646 A1 | 10/2002 | Gailey et al. |
| 2002/0164977 A1 | 11/2002 | Link, II et al. |
| 2002/0188680 A1 | 12/2002 | McCormack et al. |
| 2003/0008661 A1 | 1/2003 | Joyce et al. |
| 2003/0018479 A1 | 1/2003 | Oh et al. |
| 2003/0028529 A1 | 2/2003 | Cheung et al. |
| 2003/0032409 A1 | 2/2003 | Hutcheson et al. |
| 2003/0033292 A1 | 2/2003 | Meisel et al. |
| 2003/0046161 A1 | 3/2003 | Kamangar et al. |
| 2003/0061211 A1 | 3/2003 | Shultz et al. |
| 2003/0105677 A1 | 6/2003 | Skinner |
| 2003/0125977 A1 | 7/2003 | Morioka et al. |
| 2003/0154072 A1 | 8/2003 | Young et al. |
| 2003/0220835 A1 | 11/2003 | Barnes, Jr. |
| 2004/0023666 A1 | 2/2004 | Moon et al. |
| 2004/0043770 A1 | 3/2004 | Amit et al. |
| 2004/0044565 A1 | 3/2004 | Kumar et al. |
| 2004/0044571 A1 | 3/2004 | Bronnimann et al. |
| 2004/0059712 A1 | 3/2004 | Dean et al. |
| 2004/0076279 A1 | 4/2004 | Taschereau |
| 2004/0083133 A1 | 4/2004 | Nicholas et al. |
| 2004/0085894 A1 | 5/2004 | Wang et al. |
| 2004/0120323 A1 | 6/2004 | Viikari et al. |
| 2004/0172389 A1 | 9/2004 | Galai et al. |
| 2004/0220778 A1 | 11/2004 | Imai et al. |
| 2005/0074102 A1 | 4/2005 | Altberg et al. |
| 2005/0076017 A1 | 4/2005 | Rein et al. |
| 2005/0086104 A1 | 4/2005 | McFadden |
| 2005/0097204 A1 | 5/2005 | Horowitz et al. |
| 2005/0137939 A1 | 6/2005 | Calabria et al. |
| 2005/0144065 A1 | 6/2005 | Calabria et al. |
| 2005/0144069 A1 | 6/2005 | Wiseman et al. |
| 2005/0225810 A1 | 10/2005 | Sun |
| 2005/0234879 A1 | 10/2005 | Zeng et al. |
| 2006/0004627 A1 | 1/2006 | Baluja |
| 2006/0149624 A1 | 7/2006 | Baluja et al. |
| 2006/0195819 A1 | 8/2006 | Chory et al. |
| 2006/0247913 A1 | 11/2006 | Huerta et al. |
| 2006/0274869 A1 | 12/2006 | Morse |
| 2006/0287919 A1 | 12/2006 | Rubens et al. |
| 2007/0097975 A1 | 5/2007 | Rakers et al. |
| 2007/0127688 A1 | 6/2007 | Doulton |
| 2007/0282612 A1 | 12/2007 | Kaneko et al. |
| 2008/0021604 A1 | 1/2008 | Bouvier et al. |
| 2008/0049696 A1 | 2/2008 | Stewart |
| 2008/0052219 A1* | 2/2008 | Sandholm ............. G06Q 30/08 705/37 |
| 2008/0071536 A1 | 3/2008 | Nagashima |
| 2008/0103781 A1 | 5/2008 | Wasson et al. |
| 2008/0270223 A1 | 10/2008 | Collins et al. |
| 2008/0270224 A1 | 10/2008 | Portman et al. |
| 2008/0305778 A1 | 12/2008 | Aaltonen et al. |
| 2009/0210491 A1 | 8/2009 | Thakkar et al. |
| 2009/0240670 A1 | 9/2009 | Tiyyagura et al. |
| 2010/0306229 A1 | 12/2010 | Timm et al. |
| 2011/0010240 A1 | 1/2011 | Veach |
| 2011/0022460 A1 | 1/2011 | Bhatia et al. |
| 2011/0087660 A1 | 4/2011 | Yu et al. |
| 2011/0202494 A1 | 8/2011 | Shin et al. |
| 2011/0264644 A1 | 10/2011 | Grant et al. |
| 2011/0295990 A1 | 12/2011 | St. Jean et al. |
| 2011/0307436 A1 | 12/2011 | Cai et al. |
| 2012/0016897 A1 | 1/2012 | Tulumbas et al. |
| 2012/0030015 A1 | 2/2012 | Brunsman et al. |
| 2012/0101776 A1 | 4/2012 | Brower et al. |
| 2012/0102020 A1 | 4/2012 | Pearson |
| 2012/0138671 A1 | 6/2012 | Gaede et al. |
| 2012/0155838 A1 | 6/2012 | Gerhards et al. |
| 2012/0158954 A1* | 6/2012 | Heffernan ............... H04L 43/04 709/224 |
| 2012/0166277 A1 | 6/2012 | Gnanamani et al. |
| 2012/0265528 A1 | 10/2012 | Gruber et al. |
| 2012/0297174 A1 | 11/2012 | Frank et al. |
| 2013/0013749 A1 | 1/2013 | Kane et al. |
| 2013/0073400 A1 | 3/2013 | Heath |
| 2013/0117022 A1 | 5/2013 | Chen et al. |
| 2013/0124606 A1 | 5/2013 | Carpenter et al. |
| 2013/0144720 A1* | 6/2013 | Hari ................. G06Q 30/0241 705/14.55 |
| 2013/0275164 A1 | 10/2013 | Gruber et al. |
| 2013/0304758 A1 | 11/2013 | Gruber et al. |
| 2013/0325449 A1 | 12/2013 | Levien et al. |
| 2014/0095583 A1 | 4/2014 | Houle |
| 2014/0229184 A1 | 8/2014 | Shires |
| 2014/0350938 A1 | 11/2014 | Schroeter |
| 2017/0092278 A1 | 3/2017 | Evermann et al. |
| 2017/0110130 A1 | 4/2017 | Sharifi et al. |
| 2017/0132019 A1 | 5/2017 | Karashchuk et al. |

FOREIGN PATENT DOCUMENTS

| | | |
|---|---|---|
| JP | 11-065950 | 1/1900 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2011-192102 | 9/2011 |
| KR | 200054165 | 9/2000 |
| KR | 2002-69767 | 9/2002 |
| KR | 2003-39736 | 5/2003 |

(56) References Cited

FOREIGN PATENT DOCUMENTS

| WO | WO-97/21183 A | 6/1997 |
|---|---|---|
| WO | WO-00/42544 | 7/2000 |
| WO | WO 01/59546 A2 | 8/2001 |
| WO | WO-01/93138 | 12/2001 |
| WO | WO-2012/094329 | 7/2012 |

OTHER PUBLICATIONS

"eStara Push to Talk: The most popular click to call service in the world," downloaded from htto://www.estara.com on Jun. 29, 2004, 2 pgs.
"Ingenio: Click to Call Solutions," downloaded fromhtto://www.in2enio.com/documents/cominfo/clicktocall.aso?TF=1 on Jun. 29, 2004, 3 pgs.
"Walmart and Google to offer voice-enabled shopping", BBC News, Aug. 23, 2017.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewers Guide, AdKnowledge, May 1998.
Ad-Star.com website archive from www.Archive.org, Apr. 12, 1997 and Feb. 1, 1997.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", May 11, 2017, 11 pages.
Business Wire, "Global Network, Inc. Enters Into Agreement in Principle With Major Advertising Agency," Oct. 4, 1999.
Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.
Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Decision of Rejection for Japanese Patent Application No. 2007-519374, dated Jun. 15, 2010 (3 pgs.) with translation (3 pgs.)
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.

Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 dated Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008 (2 pgs.).
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
Hardvvick, Tim, "Facebook Smart Speaker Coming Next Year With 15-inch Touch Panel", MacRumors, Jul. 25, 2017 (5 pages).
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
International Search Report & Written Opinion on PCT/US2013/042376 dated Feb. 28, 2014.
International Search Report on International Application No. PCT/US2005/023023, dated Oct. 23, 2006, 2 pages.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages. (English translation).
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2,pgs. 112-123, Japan, Impress Holdings, Inc. (May 1, 2004).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).

(56) References Cited

OTHER PUBLICATIONS

Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Morton to Baluja email (1 pg).
Nieva, Richard, "Google Home and eBay can tell you how much that's worth", cnet, Mar. 8, 2017 (3 pages).
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action U.S. Appl. No. 14/230,508 dated Nov. 28, 2014.
Official Letter of Inquiry for Japanese Patent Application No. 2007-519374 dated Oct. 4, 2011 (3 pgs.).
Page to Karima email (1 page).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
PCT International Search Report (PCT/ISA/210) For International Application No. PCT/US05/23023 (2 pgs.) (dated Oct. 23, 2006).
PCT Written Opinion of the International Searching Authority (PCT/ISA/237) For International Application No. PCT/US05/23023 (3 pgs.).
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Request for Reexamination of U.S. Pat. No. 6,446,045 B1, Control No. 95/001,061 dated Jul. 7, 2008.
Request for Reexamination of U.S. Pat. No. 6,829,587 B2, Control No. 95/001,068, dated Jul. 14, 2008.
Request for Reexamination of U.S. Pat. No. 7,240,025 B2, Control No. 95/001,073, dated Jul. 30, 2008.
Request for Reexamination of U.S. Pat. No. 7,249,059 B2, Control No. 95/001,069, dated Jul. 21, 2008.
Sablich, Justin, "Planning a Trip Wth the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Shintaro Gotoh et al., "Citizens Lectures on GIS using Mandara and Excel, Make a Map by PC," Kokin Shoin (1st ed., Apr. 5, 2004, ISBN 4-7722-4051-9, Kokon, Japan) p. 62.
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).
Supplementary European Search Report for European Patent Application No. 05768157.9 dated Oct. 31, 2012.
Tedeschi, Bob, "Transforming Clicks Into Rings," (Jun. 7, 2004) downloaded fromwww.nvtimes.com on Jun. 6, 2004, 3 pgs.
The International Search Report and the Written Opinion of the International Searching Authority for Application No. PCT/US2013/077834 dated Apr. 24, 2014, 5 pages.
U.S. Final Office Action on U.S. Appl. No. 13/441,298 dated Dec. 30, 2013.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.

(56) References Cited

OTHER PUBLICATIONS

U.S. Office Action on U.S. Appl. No. 11/026,507 dated Mar. 30, 2009.
U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441298 dated Jan. 13, 2017.
U.S. Office Action on U.S. Appl. No. 13/478,998 dated Jul. 31, 2015.
U.S. Office Action on U.S. Appl. No. 13/478,998 dated Feb. 27, 2017.
U.S. Office Action on U.S. Appl. No. 13/840,380 dated Oct. 22, 2015.
U.S. Office Action on U.S. Appl. No. 13/840,380 dated Aug. 12, 2016.
U.S. Office Action on U.S. Appl. No. 13/840,380 dated Feb. 27, 2017.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
U.S. Office Action on U.S. Appl. No. 13/478,998 dated Jan. 20, 2016.
U.S. Office Action on U.S. Appl. No. 13/478,998 dated Oct. 5, 2016.
U.S. Office Action on U.S. Appl. No. 14/172,353 dated Aug. 10, 2017, 15 pages.
U.S. Office Action on U.S. Appl. No. 14/172,353 dated Feb. 9, 2017.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.
U.S. Notice of Allowance on U.S. Appl. No. 13/478,998 dated Sep. 12, 2017.
U.S. Office Action on U.S. Appl. No. 15/395,703 dated Oct. 19, 2017.

* cited by examiner

PROVIDING AN ADVERTISEMENT BASED ON A MINIMUM NUMBER OF EXPOSURES

BACKGROUND

The present disclosure relates generally to systems and methods for providing an advertisement based on a minimum number of exposures and more particularly, to select a bid for each exposure and provide display data indicative of the advertisement based on the bid.

SUMMARY

In one implementation, in general, a computer-implemented method includes receiving selection criteria to specify a device identifier that meets the selection criteria. The method may yet further include receiving a minimum number of exposures to the advertisement and an interval of time for the minimum number of exposures to occur, and a maximum aggregate bid value to be paid for each device identifier that is exposed to the advertisement for the minimum number of exposures. The method may also include determining a probability that the device identifier reaches the number of exposures within the interval of time and within the maximum aggregate bid value. The method may also include selecting a bid for each exposure for the device identifier based on the determined probability and the maximum aggregate bid value. The method may include providing display data indicative of the advertisement, based on the selection of the bid. The method may also include updating the device identifier representative of the number of exposures to the advertisement.

In another implementation, in general, a system may include a tangible computer-readable storage device including instructions; and a processor coupled to the tangible computer-readable device and configured to execute the instructions to perform operations. The operations may include receiving selection criteria to specify the device identifier that meets the selection criteria. The operations may also include receiving a minimum number of exposures to the advertisement and an interval of time for the minimum number of exposures to occur, and a maximum aggregate bid value for each device identifier that is exposed to the advertisement for the minimum number of exposures. The operations may include determining a probability that the device identifier reaches the number of exposures within the interval of time and within the maximum aggregate bid value. The operations may also include selecting a bid for each exposure for the device identifier based on the determined probability and the maximum aggregate bid value. The operations may include providing display data indicative of the advertisement, based on the selection of the bid. The operations may yet further include updating the device identifier representative of the number of exposures to the advertisement.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Advertisers can determine goals for exposure to certain advertisements or groups of advertisements within their advertising campaigns. Advertisers may also determine a strategy for what times to serve the advertisements to meet their goals for exposure. The strategy may be based on previous exposures of the advertisements to the users.

The exposures may be determined by a number of devices, e.g., a set-top box, a television, a web page, etc. used to serve the advertisements. The devices may include a database to store the number of exposures and the time of exposure.

Based on the number of exposures of advertisements, advertisers can determine or update strategies for their proposed, i.e., yet to be served, advertisements. For example, advertisers concerned with delivering a message believe that users may need to be exposed to the message a minimum number of times, in a given period of time, before the user is aware of the message. Although a click would count as a recognition of the message, clicks are not a reliable source to estimate the minimum number of exposures, e.g., clicks are infrequent and do not acknowledge every time a user is exposed to the message and does not click on the message.

In a general overview, the advertiser can determine a minimum number of exposures for an interval of time. The advertiser may also determine a maximum aggregate bid value for each user. An advertisement server determines the probability that a user will meet the minimum number of exposures within the interval of time. Given the probability, the advertisement server adjusts bidding within the advertiser's maximum aggregate bid value for each user that meets the minimum number of exposures within the interval of time.

Figure 1:
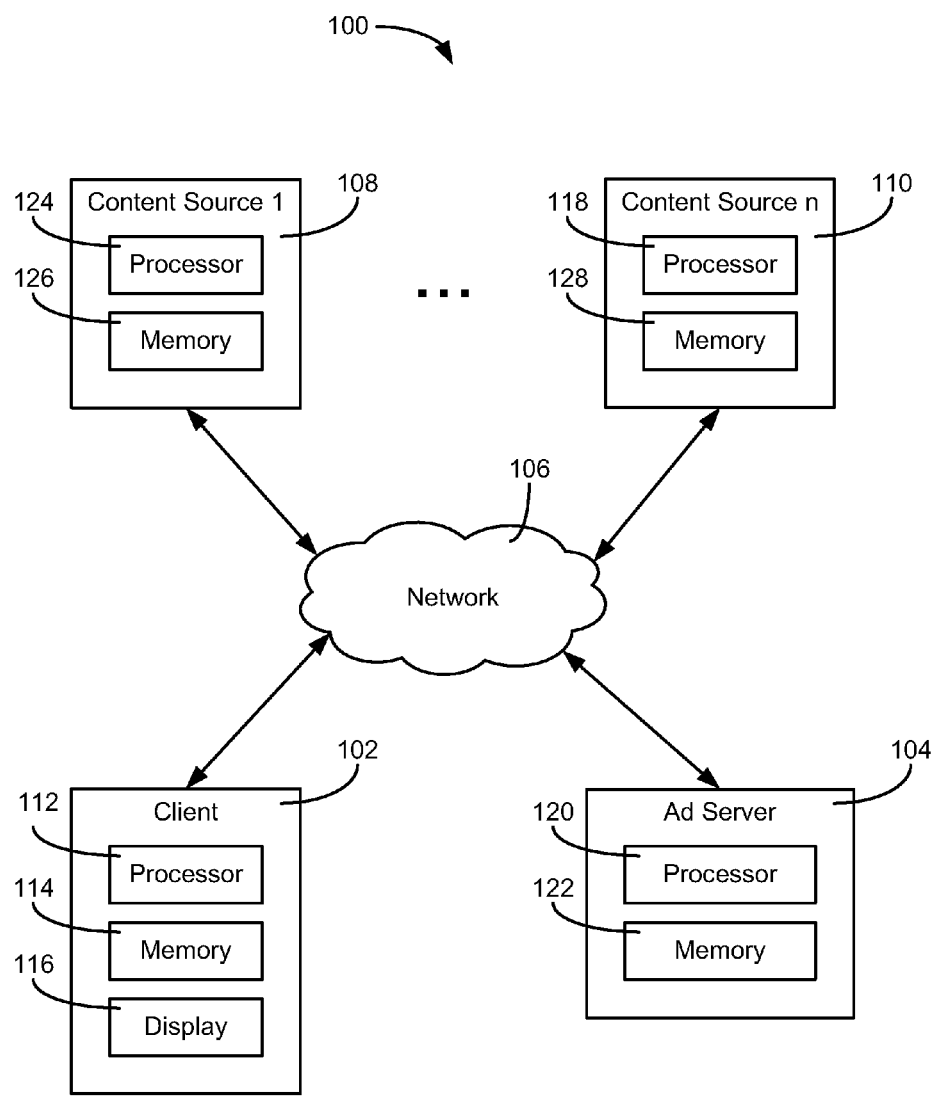
FIG. 1 is an example of a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to clients client 102. System 100 may include an advertisement server 104, which provides advertisement data to other computing devices over network 106.

Network 106 may be any form of computer network that relays information between client 102, advertisement server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from advertisement server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, advertisement server 104 may include a processing circuit including a processor 120 and a memory 122. In some implementations, advertisement server 104 may include several computing devices (e.g., a data center, a network of servers, etc.). In such a case, the various devices of advertisement server 104 may comprise a processing circuit (e.g., processor 120 represents the collective processors of the devices and memory 122 represents the collective memories of the devices).

Advertisement server 104 may provide digital advertisements to client 102 via network 106. For example, content source 108 may provide a webpage to client 102, in response to receiving a request for a webpage from client 102. In some implementations, an advertisement from advertisement server 104 may be provided to client 102 indirectly. For example, content source 108 may receive advertisement data from advertisement server 104 and use the advertisement as part of the webpage data provided to client 102. In other implementations, an advertisement from advertisement server 104 may be provided to client 102 directly. For example, content source 108 may provide webpage data to clients client 102 that includes a command to retrieve an advertisement from advertisement server 104. On receipt of the webpage data, client 102 may retrieve an advertisement from advertisement server 104 based on the command and display the advertisement when the webpage is rendered on display 116.

According to various implementations, a user of client 102 may search for, access, etc. various documents (e.g., web pages, web sites, articles, images, video, etc.) using a search engine via network 106. The web pages may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In other implementations, advertising may be displayed in a publication (e.g., a third party web page) as in a display network. For example, a number of web pages and applications may show relevant advertisements. The advertisements may be matched to the web pages and other placements, such as mobile computing applications, according to relevant content or themes of the web pages. Specific web pages about specific topics may display the advertising. The advertisement may be shown to all the web pages or a select number of web pages.

In another implementation, advertisers may purchase or bid on the search terms such as keyword entries entered by users into a document such as a search engine. When the search term or keyword are entered into the document, then advertising data such as links to an advertiser website may be displayed to the user. In some implementations, server 104 may use an auction model that generates an advertisement. Advertisers may bid on keywords using the auction model. The auction model may also be adjusted to reflect the maximum amount an advertiser is willing to spend so that a user is exposed to an advertisement a minimum number of times.

Figure 2:
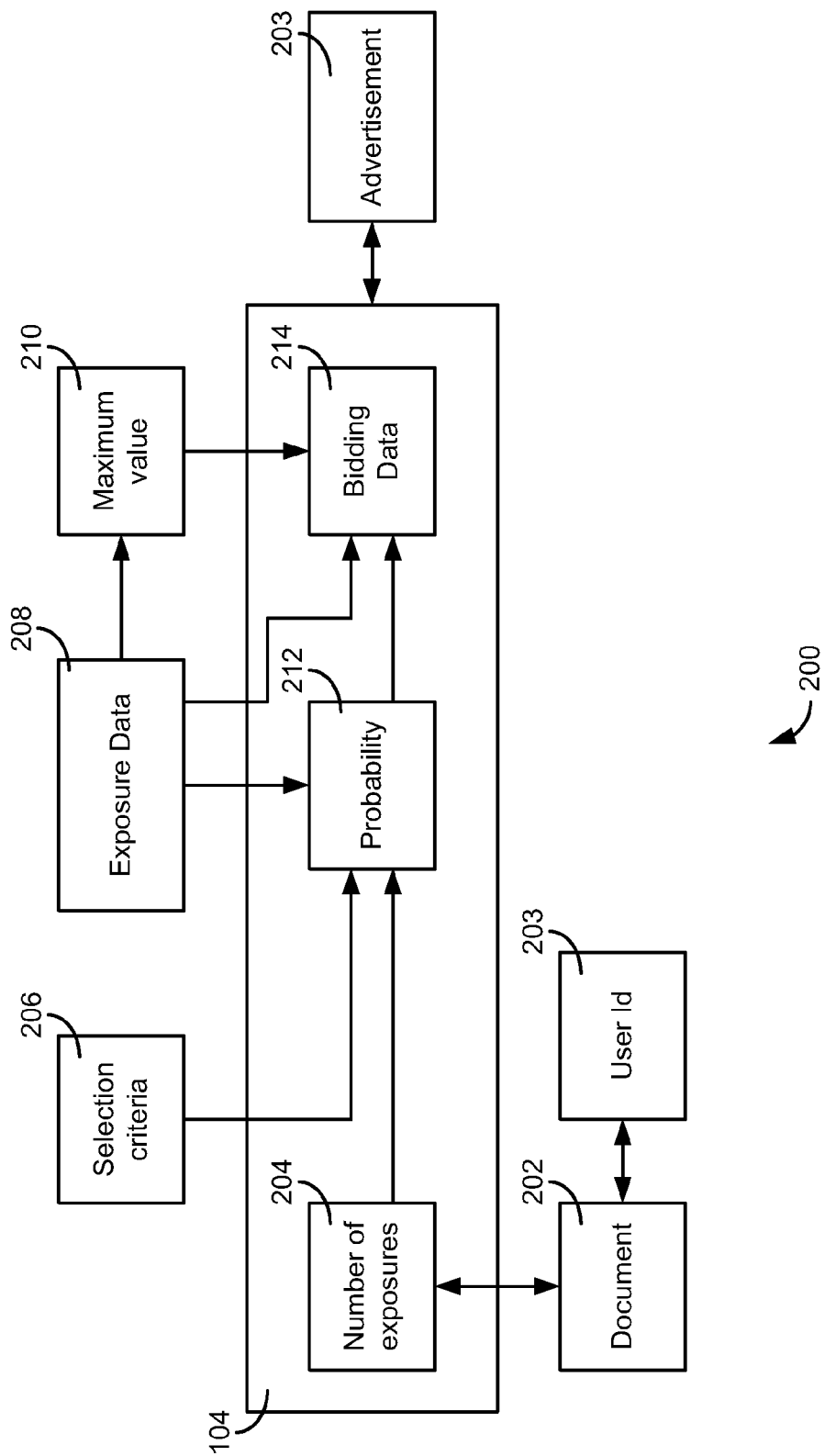
FIG. 2 is an illustration of an example system for serving advertisements in accordance with a described implementation.

FIG. 2 is an example of an illustration of a block diagram of a system 200 for serving advertisements for a minimum number of exposures in accordance with a described implementation.

In a brief overview, system 200 includes document 202, advertisement server 104, and advertiser module 206. Generally, system 200 allows advertisers to set a minimum number of exposures over an interval of time, and a per-user maximum aggregate bid value for meeting the minimum number of exposures within the interval of time.

Document 202 may include any machine-readable content, which may include text, graphics, images, videos, multimedia graphics, etc. Document 202 may be encoded in a markup language, e.g., Hypertext Markup Language (HTML), i.e., a web page rendered in JavaScript or in any other machine readable or executable format. Document 202 may include a hyperlink to another document.

Document 202 may receive device identifier 203 when document 202 is rendered to client device 102. Device identifier 203 may be stored by client device 102. Device identifier 203 may be included in a user record, e.g., a user profile. Device identifier 203 may associate the information in the user record to a particular user or client device 102. A user may opt in or out of allowing advertisement server 104 or other content source to identify and store information about the user and/or about devices operated by the user. For example, the user may opt in to receiving advertisements from advertisement server 104 that may be more relevant to her. In one implementation, the user may be represented as a randomized device identifier (e.g., a cookie, a device serial number, etc.) that contains no personally-identifiable information about the user. For example, information relating to the user's name, demographics, etc., may not be used by an advertisement server unless the user opts in to providing such information. Thus, the user may have control over how information is collected about him or her and used by an advertisement server or other content source.

In some implementations, device identifier 203 is associated with a particular instance of a client application (e.g., running on client device 102). In some implementations, device identifier 203 is associated with a user (e.g., when the user logs in with a username and password). Some information that may be associated with the user may include events, such as one or more queries, one or more clicks, browser history data (e.g., the URLs visited, the number of URLs viewed, URL visit durations, etc.), etc. Events may also include advertising metrics, such as impressions, click through rate, etc. for each user. For example, device identifier 203 may include a time stamp associated with a particular event. Events may also include exposure data 208, i.e., how many times a user is exposed to a particular ad, a campaign, etc. In some implementations, exposure data 208 may include the number of exposures associated with device identifier 203, a time stamp of the exposures (when), and how the exposures occurred (e.g., placement of the advertisement, interaction with the advertisement, etc).

A content network may select content to be provided with a webpage based on device identifier 203 for a user visiting document 202. For example, a user may opt in to receiving relevant advertisements from an advertisement server. Rather than selecting an advertisement to be provided on document 202 based on the content of document 202 itself or on other factors, advertisement server 104 may take into account device identifier 203 provided as part of a content request. In one example, a user may visit a number of webpages devoted to reviews of golf clubs and later visit a webpage to check stock quotes. Based on the user's visits to the golf-related webpages, the user may be determined to be interested in receiving advertisements for golf clubs. When the user later visits the webpage to check stock quotes, an online retailer of golf equipment may seek to include an advertisement on the webpage for that particular user, even though the financial webpage is unrelated to golf.

If content is selected based in part on a device identifier for a user that opts in to receiving more relevant content, a content provider may specify that certain content is to be provided to a set of device identifiers. For example, an advertiser may identify a set of device identifiers associated with visiting the advertiser's website and making a purchase. Such users may later wish to know if the advertiser is running a sale. In some cases, an advertising network may identify users on behalf of the advertiser that may be interested in receiving advertisements from the advertiser. For example, advertisers may specify a number of topic categories for their advertisements and the advertising network may match users' interests to the categories, to provide relevant advertisements to the users.

Device identifier 203 may be received by advertisement server 104. Advertisement server 104 may retrieve exposure data 208. For example, exposure data 208 may include the number of exposures to device identifier 203. Exposure data 208 may also include how recent the exposures were to device identifier 203 or when the exposures occurred.

Advertisement server 104 may receive advertising metrics and selection criteria 206. For example, advertisement server 104 may receive the total number of different viewers exposed to the advertisement (at least once, twice, etc.) during an interval of time, which may be determined by the advertiser, publisher, etc. Selection criteria 206 may include demographics, placement, geo-location, etc, which may be determined by the advertiser, publisher, etc. Selection criteria 206 may also include budgetary criteria. For example, the advertiser may provide a per-user maximum aggregate bid value 210 for meeting the minimum number of exposures. In some implementations, the minimum number of exposures may have to occur within an interval of time. In another implementation, advertisement server 104 may store device identifier 203 and exposure data 208.

In some implementations, advertisement server 104 stores selection criteria 206. In another implementation, advertisement server 104 determines the probability 212 that device identifier 203 will receive the minimum number of exposures within the interval of time and within the maximum aggregate bid value 210, i.e., exposure data 208. Given the probability 212, advertisement server may adjust bidding data 214 with the budgetary criteria (e.g., the per-user maximum aggregate bid value).

Figure 3:
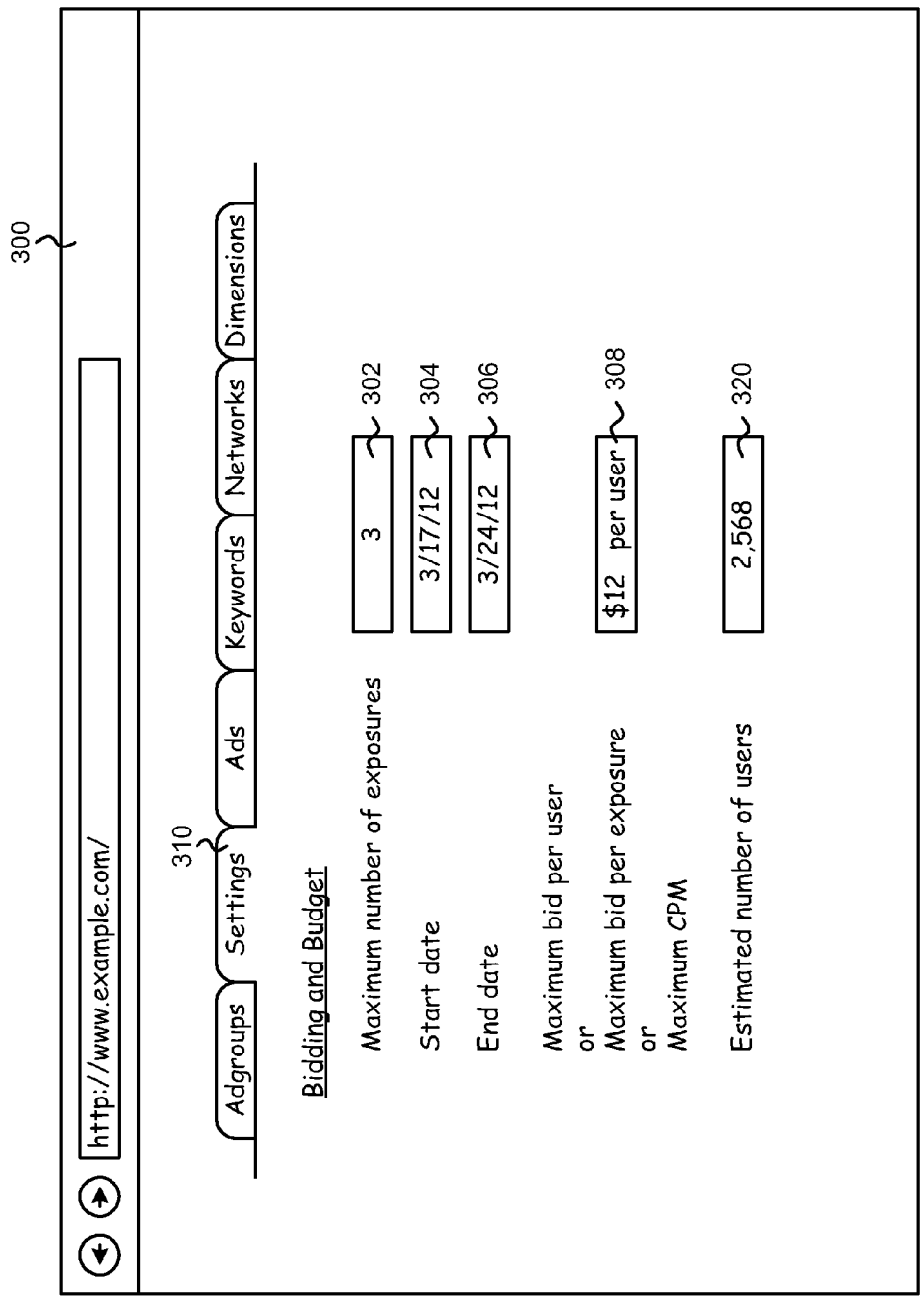
FIG. 3 is an illustration of an example interface for an advertiser in accordance with a described implementation.

FIG. 3 is an illustration 300 of a user interface that allows the advertiser to determine selection criteria. In the example, the advertiser may determine the following settings 310, a minimum number of exposures at input field 302, a start date at input field 304, an end date at input field 306, a maximum bid per user, and a maximum bid for exposure, or a maximum CPM (cost per mille) at input field 308. Other variations of the settings may be implemented. Once these settings are entered, the system may determine the estimated number of expected unique users at output field 320.

For example, the advertiser may determine that a user needs to view their advertising message three times within a week for the user to be aware of the advertising message, thereby entering three at input field 302, and a start date at input field 304, and an end date at input field 306.

At input field 308, the advertiser may determine a maximum aggregate bid value 210 of $12 per user as an appropriate maximum amount to pay for exposing the user to the advertising message for the minimum of three times within one week. The advertiser may also enter a maximum bid per exposure or CPM.

At output field 320, the system may automatically estimate the number of expected unique users that the advertisement will be exposed to. The advertiser can then alter input fields 302-308 to change output field 310.

Advertisement server 104 receives selection criteria 206 that may include exposure data 208 of a minimum of three exposures per user within one week. Advertisement server 104 may also receive the budgetary criteria that includes the maximum aggregate bid value per user of $12.

In the example, advertisement server 104 may determine the probability that a user is likely to meet the minimum number of three exposures within one week given selection criteria 206. Advertisement server 104 may provide bidding data 214 for each exposure based on the determined probability 212 and the maximum aggregate bid value of $12 per user. If and when the auction is won, the advertisement 216 may be provided, while updating device identifier 203 and/or advertisement server 104.

Figure 4:
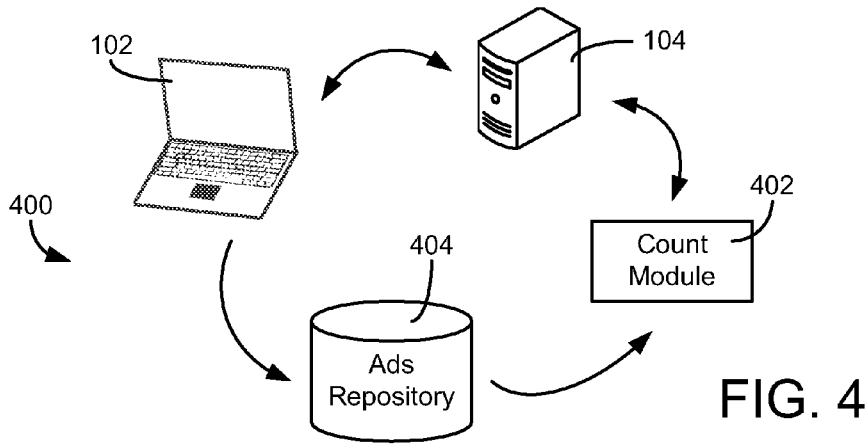
FIG. 4 is an example of a system for updating the device identifier in accordance with a described implementation.

FIG. 4 is an illustration 400 of a system for updating the device identifier in accordance with a described implementation. Illustration 400 may include device 102 including device identifier 203, advertisement server 104, count module 402 and advertisement repository 404.

Device 102 may receive a rendered web page along with an advertisement from advertisement server 104. The advertisement may be selected by the advertiser as an advertisement having a goal for a minimum number of exposures within an interval of time.

Count module 402 receives information from advertisement server 104 that the advertisement has been provided to device 102. Count module 402 may update the number of exposures. Count module 402 may store the number of exposures as exposure data in ads repository 404.

In some implementations, Ads repository 404 may receive exposure data in order to determine which advertisement to generate and provide to advertisement server 104. Repository 404 may include advertisements that are tagged with exposure data or repository 404 may tag the advertisements with the exposure data. Repository 404 may provide the advertisements tagged with exposure data to device 102 or to advertisement server 104 to be displayed on a web page.

In some implementations, device 102 provides exposure data to advertisement server 104 after receiving a rendered document 202 from advertisement server 104. In other implementations, device 102 may provide the exposure data to ads repository 404.

Figure 5:
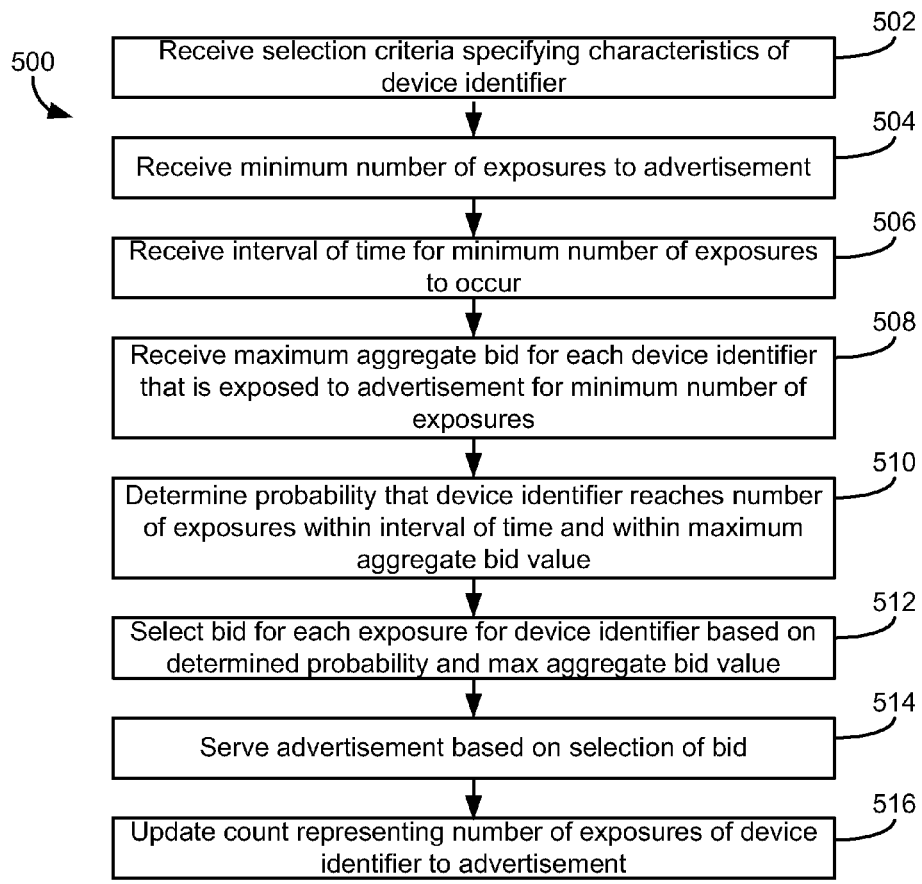
FIG. 5 is an example of a flow diagram for serving advertisements in accordance with a described implementation.

FIG. 5 is an example of a flow diagram of a method 500 for providing an advertisement with a minimum number of exposures. Example method 500 may be implemented by various combinations of systems. Example method 500 may be performed online or offline.

Example method may begin at block 502, selection criteria to specify the device identifier that meets the selection criteria is received. For example, the selection criteria may define one or more characteristics of the users to which the advertisement is directed. If a device identifier has one or more of the defined characteristics, then the device identifier meets the selection criteria. If the device identifier does not include one or more (or at least a threshold number) of the characteristics, then the advertisement may not be provided to the device identifier. In some implementations, the selection criteria may include budgetary criteria, e.g., one or more bids.

At block 504, a minimum number of exposures to the advertisement and an interval of time for the minimum number of exposures to occur is received. In some implementations, the minimum number of exposures is stored in a memory. A maximum aggregate bid value to be paid for each device identifier that is exposed to the advertisement for a minimum number of exposures may also be received. In some implementations, the minimum number of exposures and the interval of time includes a frequency, i.e., how many times the advertisement is exposed within a set period of time. In some implementations, the interval of time may include a length of time the advertisement is exposed, e.g., 1 week. In other implementations, the interval of time may include a time of day when the advertisement is exposed.

At block 506, a probability that the device identifier reaches the number of exposures within the interval of time and the maximum aggregate bid value is determined. Probability may be determined using a number of methods including, but not limited to, distributed gradient descent and logistic regression.

If there is sufficient historical data for a user, then the application of the desired interval of time and the desired selection criteria are applied to produce a prediction. In this implementation, statistical methods may not be needed. Either the prediction will indicate that the user will meet the minimum number of exposures in the interval of time or not.

If there is not sufficient historical data for a user, then the system may determine by an estimation or a guess whether the user will meet the minimum number of exposures within the interval of time. In an example, the system may receive the historical data that it does have for the user to compare the data to a population of similar users that have sufficient historical data, e.g., any correlated or detectable data may be used. The population of similar users may produce a probability of meeting the minimum number of exposures within the interval of time for the desired selection criteria. This probability is then applied to the newly observed user, e.g., if seventy percent of the similar population would meet the minimum number of exposures, then the 0.7 probability is applied to the newly observed user.

At block 508, a bid for each exposure for the device identifier based on the determined probability and the maximum aggregate bid value is selected. When selection criteria is met, then the probability is determined at block 510, which may produce a weight used to adjust a bid. The higher the probability, then the higher the bid, with a maximum combination of minimum exposures not exceeding the maximum aggregate bid value.

In some implementations, the probability may be conditional and adjusted based on the number of exposures. For example, a user that is one exposure away from meeting the minimum number of exposures may receive a higher bid than a user that is three exposures away, provided all other criteria is equal. The system may also determine a different probability for each user. A weight may also be determined to select a bid.

At block 512, a bid is selected for each exposure for the device identifier based on the determined probability and the maximum aggregate bid value. The weight is the mechanism that can adjust a bid to favor impressions that are more likely to meet the goal minimum number of exposures in the interval of time. In some implementations, the probability may be used as the weight. In this implementation, however, campaign constraints may limit how low or high the weight can be set.

The weight used to adjust a bid may be determined by historical impression data, for each device identifier, while also applying the selection criteria and the interval of time. If there are a sufficient number of impressions to meet the minimum number of exposures, then the bidding weight may be applied. If there is not a sufficient number of impressions, then no bidding weight may be applied. The probability is used to change the bid when the user is close to meeting the minimum number of exposures. In other implementations, the probability may not be used when the user is far from meeting the minimum number of exposures.

In another example, there may not be enough information to determine the probability, because the user is new or there is not enough historical impression data. In these cases, the probability may be determined based on whether similar device identifiers meet the minimum number of exposures within the interval of time. Similar users may be selected based on regression analysis, where user characteristics, such as, but not limited to, browser, operating system, browser history, interests, etc., may determine whether the user will meet the minimum number of exposures. Then, a user model may be constructed along with the probability. The probability from the model may be used to set the bidding weight to bias exposures to users most likely to meet the minimum number of exposures within the interval of time.

At block 514, an advertisement is served on selection of the bid. In some implementations, serving may include providing display data, which may be indicative of the advertisement. The advertisement server may provide the display data to the client device. The advertisement server may be configured to cause the client to display the advertisement. In some implementations, the display data may cause the advertisement to be displayed. In other implementations, the display data may include the advertisement itself. In yet another implementation, the display data may include a selection of an advertisement present on the client device, e.g., the advertisement server alerts the client device that there is a selected advertisement. The display data may be provided to an interface, e.g., a graphical user interface, a command line interface, etc. At block 516, the count is updated representing the number of exposures of device identifier to the advertisement, as shown in FIG. 4.

In an alternative implementation, the total number of different users exposed to the advertising message during a given period and how many times they are exposed to the advertising message may be predicted for an advertising campaign, e.g., using gross rating points or target rating points, which equate to how many times the message aired times the number of users that were exposed to the advertising message. The bid may be adjusted so that the prediction aligns with the minimum number of exposures per user for the total number of users exposed.

In some implementations, a third party may access the optimization technology of advertisement server 104 using a user interface (e.g., GUI, command-line, etc.) or an application programming interface.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code), embodied on a tangible medium, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of providing content to computing devices in an online computer networked environment, comprising:
   receiving, at a server comprising at least one first processor and at least one first memory operably coupled to the at least one first processor, selection criteria specifying characteristics of a device identifier;
   receiving, at the server:
      a count representing a number of exposures of the computing device associated with the device identifier;
      a minimum number of exposures of a content item to provide for display on a computing device associated with a device identifier;
      an interval of time for the minimum number of exposures to occur on the computing device; and
      a maximum aggregate bid value for the device identifier that is exposed to the content item for the minimum number of exposures, the maximum aggregate bid value for the device identifier based on the minimum number of exposures to the advertisement content item by the computing device associated with the device identifier, and based on the interval of time for the minimum number of exposures to occur on the computing device;
   selecting, based on the characteristics of the device identifier, an exposure model;
   determining, at the server and responsive to the count being below a predetermined threshold, a probability from the exposure model that the device identifier reaches the minimum number of exposures within the interval of time and within the maximum aggregate bid value based on the count;
   selecting a bid for each exposure for the device identifier based on the probability and the maximum aggregate bid value;
   serving the content item based on the bid to the computing device associated with the device identifier; and
   updating the count representing the number of exposures of the computing device associated with the device identifier to the content item.

2. The method of claim 1, wherein the device identifier is associated with an instance of a client application.

3. The method of claim 1, wherein the interval of time comprises a length of time the content item is exposed.

4. The method of claim 1, wherein the interval of time comprises a time of day when the content item is exposed.

5. The method of claim 1, further comprising:
   storing, in a memory, the device identifier and an indication of the minimum number of exposures.

6. The method of claim 1, wherein the selection criteria comprises one or more bids.

7. The method of claim 1, further comprising:
   predicting a reach and interval of time for an advertisement campaign, wherein the content item campaign comprises the content item.

8. The method of claim 7, further comprising:
   based on the prediction, matching the reach and the interval of time with the minimum number of exposures.

9. The method of claim 7, wherein the reach comprises a total number of computing devices exposed to the content item during the interval of time.

10. The method of claim 1, further comprising:
    receiving a request for the content item to be displayed on a web page.

11. A system to provide content to computing devices in an online computer networked environment, comprising:
    communications circuitry; and
    a processor coupled to the communications circuitry, the processor operative to:

receive, via the communications circuitry, selection criteria specifying characteristics of a device identifier;

receive:
- a count representing a number of exposures of the computing device associated with the device identifier;
- a minimum number of exposures of a content item to provide for display on a computing device associated with a device identifier;
- an interval of time for the minimum number of exposures to occur on the computing device; and
- a maximum aggregate bid value for the device identifier exposed to the content item for the minimum number of exposures, the maximum aggregate bid value for the device identifier based on the minimum number of exposures of the content item to the computing device associated with the device identifier, and based on the interval of time for the minimum number of exposures to occur on the computing device;

select, based on the characteristics of the device identifier, an exposure model;

determine, responsive to the count being below a predetermined threshold, a probability from the exposure model that the device identifier reaches the minimum number of exposures within the interval of time and within the maximum aggregate bid value based on the count;

select a bid for each exposure for the device identifier based on the probability and the maximum aggregate bid value;

serve the content item based on the selection of the bid; and update the count representing the number of exposures of the computing device associated with the device identifier to the content item.

12. The system of claim 11, wherein the device identifier is associated with an instance of a client application.

13. The system of claim 11, wherein the interval of time comprises a length of time the item is exposed.

14. The system of claim 11, wherein the interval of time comprises a time of day when the content item is exposed.

15. The system of claim 11, wherein the processor is further operative to:
store, in a memory, the device identifier and the minimum number of exposures.

16. The system of claim 11, wherein the selection criteria comprises one or more bids.

17. The system of claim 11, wherein the processor is further operative to:
predict a reach and interval of time for an advertisement campaign, wherein the content item campaign comprises the content item.

18. The system of claim 11, wherein the processor is further operative to:
based on the prediction, match the reach and the interval of time with the minimum exposures.

19. The system of claim 11, wherein the reach comprises a total number of computing devices exposed to the content item during the interval of time.

20. A system of providing content to computing devices in an online computer networked environment, comprising:
a tangible computer-readable storage device comprising instructions; and
a processor coupled to the tangible computer-readable device and configured to execute the instructions to perform operations comprising:
receiving, at a server, selection criteria specifying characteristics of a device identifier;
receiving, at the server:
- a count representing a number of exposures of the computing device associated with the device identifier;
- a minimum number of exposures of a content item to provide for display on a computing device associated with a device identifier;
- an interval of time for the minimum number of exposures to occur on the computing device; and
- a maximum aggregate bid value to be paid for the device identifier exposed to the content item for the minimum number of exposures, the maximum aggregate bid value for the device identifier based on the minimum number of exposures of the content item to the computing device associated with the device identifier, and based on the interval of time for the minimum number of exposures to occur;

selecting, based on the characteristics of the device identifier, an exposure model;

determining, responsive to the count being below a predetermined threshold, a probability from the exposure model that the device identifier reaches the minimum number of exposures within the interval of time and within the maximum aggregate bid value based on the count;

selecting a bid for each exposure for the device identifier based on the probability and the maximum aggregate bid value;

serving the content item based on the selection of the bid; and updating the count representing the number of exposures of the device identifier to the content item.

* * * * *